United States Patent
Yoshihara et al.

[11] Patent Number: 5,363,207
[45] Date of Patent: Nov. 8, 1994

[54] ADAPTOR DEVICE FOR A FACSIMILE

[75] Inventors: Kenzou Yoshihara, Kounosu; Toshio Osawa, Fujimi; Takayuki Kojima, Kawagoe; Shinichi Machida, Sakado, all of Japan

[73] Assignee: Nippon Conlux Co., Ltd., Tokyo, Japan

[21] Appl. No.: 779,367

[22] Filed: Oct. 17, 1991

[30] Foreign Application Priority Data

Oct. 19, 1990 [JP] Japan .................................. 2-279112
Apr. 30, 1991 [JP] Japan .................................. 3-126691

[51] Int. Cl.$^5$ ............................................. H04N 1/00
[52] U.S. Cl. .................... 358/442; 358/406; 358/444; 370/79
[58] Field of Search ............... 358/400, 406, 407, 435, 358/436, 437, 442, 444, 426, 468; 379/93, 100, 211; 370/58.1, 79, 110.1; H04N 1/00

[56] References Cited

U.S. PATENT DOCUMENTS

| | | | |
|---|---|---|---|
| 4,961,185 | 10/1990 | Sawada | 379/100 |
| 4,964,154 | 10/1990 | Shimotomo | 379/211 |
| 5,021,890 | 6/1991 | Yoshida et al. | 358/437 |
| 5,041,918 | 8/1991 | Ishida et al. | 358/450 |
| 5,050,005 | 9/1991 | Kagami | 379/100 |
| 5,057,941 | 10/1991 | Moriya | 358/435 |
| 5,142,568 | 8/1992 | Ogata et al. | 358/442 |

Primary Examiner—Edward L. Coles, Sr.
Assistant Examiner—Kim Yen Vu
Attorney, Agent, or Firm—Graham & James

[57] ABSTRACT

Data produced from a transmission source facsimile are received by a simulated communication circuit network, and thus received data are compressed and temporarily stored into a memory. After the data have been compressed, the data stored in the memory are read out and transmitted to an other party's facsimile via an external communication circuit network. Since the data transmitted to the other party's facsimile via the external communication circuit network are compressed data, a time required for transmission can be relatively shortened. Accordingly, a rapid data transmission can be achieved without the facsimile being replaced by a rapid type facsimile which is expensive. Further, various additional functions of a facsimile can be directly enjoyed from those intrinsically owned by the transmission source facsimile. In addition, such arrangements may be made that a time presumably required for communication via the simulated communication circuit network is measured as a presumed time of communication in the normal transmission mode, while an actual time of communication in which a rapid transmission has been done by means of highly compressed data is measured, and that both the presumed communication time and the actual communication time are notified to the user so that the user can realize having saved the communication cost by means of the transmission involving data compression.

7 Claims, 6 Drawing Sheets

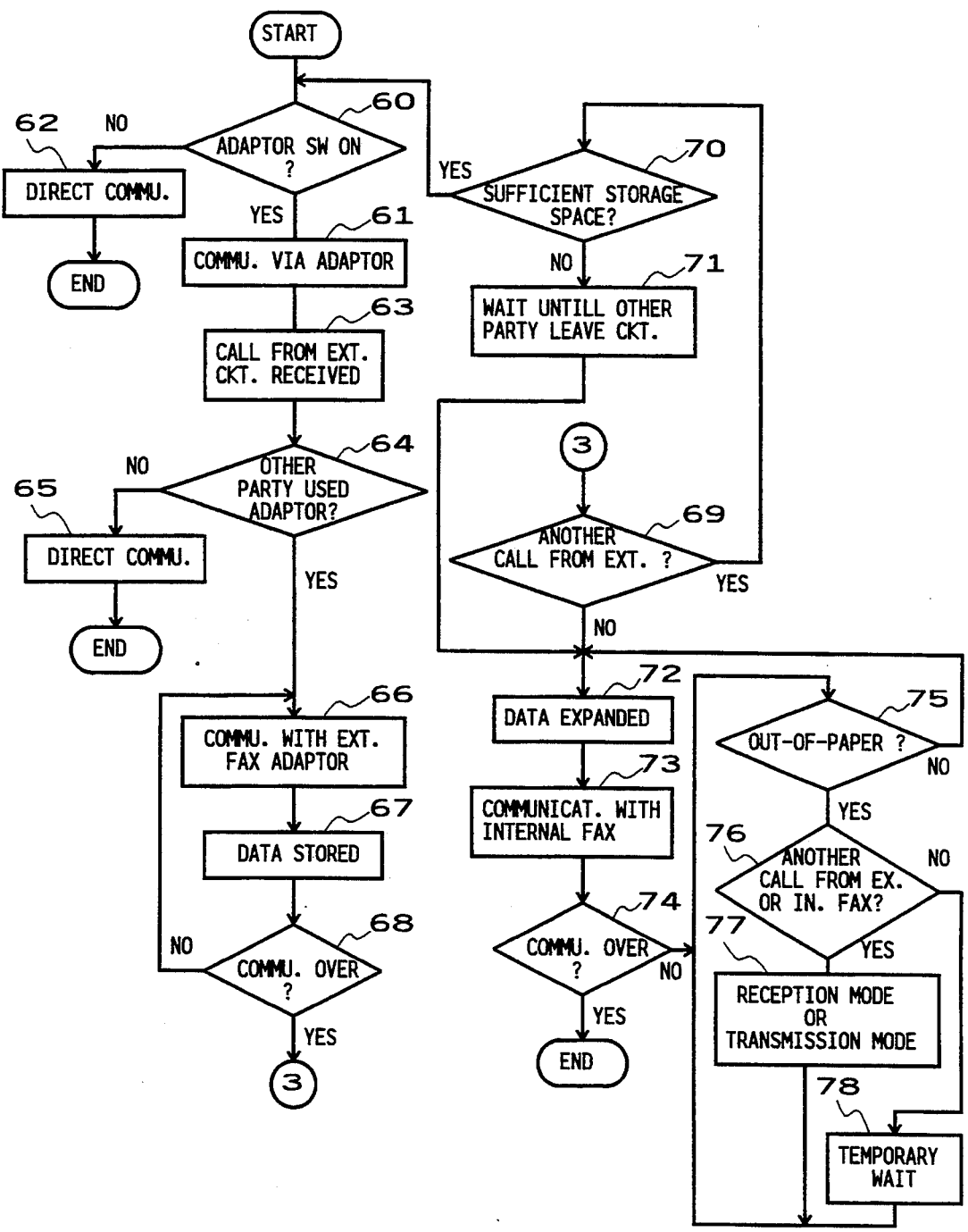
F I G. 5

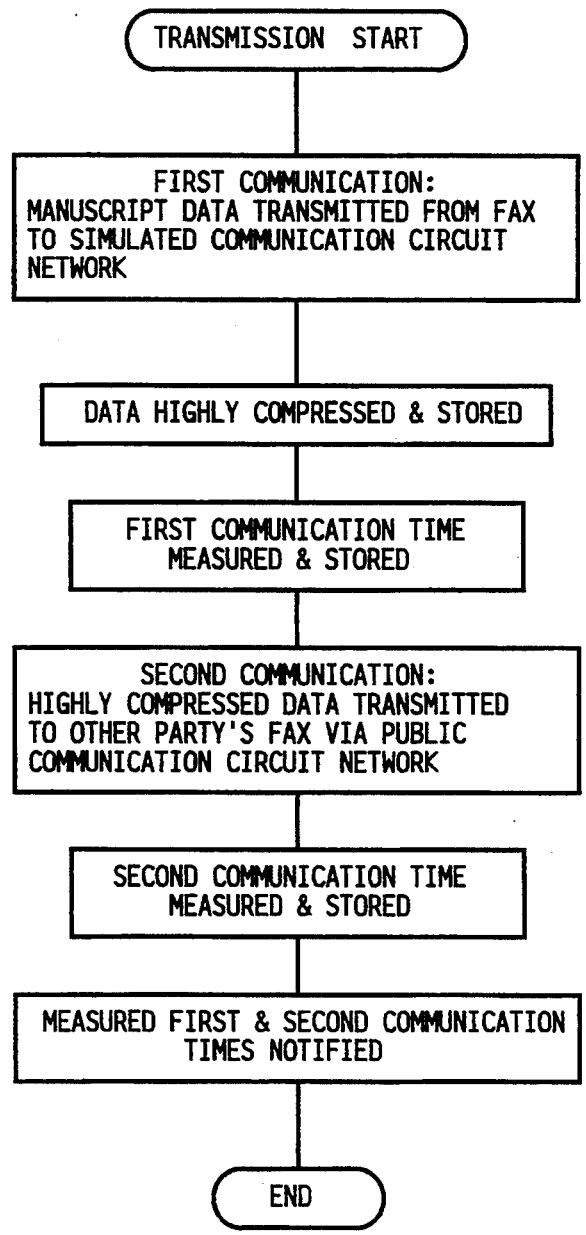
F I G. 7

ADAPTOR DEVICE FOR A FACSIMILE

BACKGROUND OF THE INVENTION

The present invention generally relates to an adaptor device for a facsimile, and more particularly to such a device which, by means of data compression, allows data to be transmitted to the other party in a shorter time than a transmission time normally required or consumed by a facsimile.

The present invent ion further relates to an adaptor device for a facsimile which, by means of data compression, allows data to be transmitted to the other party in a shorter time than a transmission normally required by a facsimile and by which a user can be notified of both an actual transmission time that has been actually required for a transmission utilizing data compression, and a presumed transmission time that would have been required if the transmission had been done without data being compressed, so that the user can realize having saved the communication cost by means of such transmission utilizing data compression.

For now existing facsimile devices, there are various standards such as G1, G2, G3 depending on the technique utilized therein for compressing data, and a required data transmission time varies depending on the standard. The facsimile devices are connected directly to an external telephone circuit network. This means that data transmission time is determined by the specific or intrinsic performance of the facsimile device used. To save the communication cost, a shorter transmission time is more is preferable. But, there the problem that facsimile devices which can achieve a shorter transmission time tends to be higher in the manufacturing cost. On the other hand, there are some facsimile devices which can achieve a relatively short transmission time and can also be manufactured at a relatively low cost, but most of those devices are unsatisfactory in that they do not have a function for cutting papers or other various functions, or images provided thereby are poor in quality.

SUMMARY OF THE INVENTION

It is therefore an object of the present invention to provide an adaptor for a facsimile which can achieve a data transmission time shorter than that normally required by the intrinsic performance of a facsimile.

An adaptor device for a facsimile according to the present invention is adapted to be connected between a facsimile and an external communication circuit network, and the adaptor device comprises a simulated communication network section for, when a call has been given from the facsimile to an other party's facsimile, receiving the call and data to be transmitted from the facsimile, a data compression section for compressing the data received via the simulated communication network section in accordance with a predetermined data compression technique, a memory section for storing compressed data, and a transmission control section for reading out the data stored in the memory section and transmitting the same to the other party's facsimile via the external communication circuit network.

The adaptor device further includes a successive storage selection switch, a successive storage termination switch and a successive transmission control section, said successive transmission control section successively receiving data directed to various other parties and given from said facsimile via said simulated communication network and causing said data to be successively stored in said memory section via said data compression section, when a successive storage is selected by said successive storage selection switch. And said successive transmission control section sequentially reads out the data directed to the various other parties which are stored in said memory section and causes the data to be transmitted to each of said other parties via said transmission control section, when said successive storage termination switch has been actuated.

The adaptor device for a facsimile also includes a reception control section for receiving data given from the other party via said external communication circuit network, determining whether or not received data from the other party are data compressed in accordance with said data compression technique, giving the received data to the facsimile if the received data are not data compressed in accordance with said data compression technique, but storing the received data into said memory section if the received data are data compressed in accordance with said data compression technique, and a decoding section for reading out the data stored in said memory section by said reception control section so that data decoded by said decoded section are given to said facsimile via said simulated communication network section.

To describe the transmission mode of the adaptor device first, when a call has been given from the facsimile to the other party's facsimile, the simulated communication network section receives the call anti data to be transmitted from the facsimile; that is, the transmission source facsimile starts transmitting the data to the adaptor device as if the data were being directly received by the other party's facsimile. But, at this time, the data from the transmission source facsimile are not sent to the external communication circuit network but they are sent to and received by the simulated communication network. The data received via the simulated communication network are compressed by the data compression section and then temporarily stored into the memory section. After the data have been compressed and stored, the data are read out to be transmitted to the other party's facsimile via the external communication circuit network.

Since the data transmitted to the other party's facsimile via the external communication circuit network are in compressed form, a time required for the data transmission can be relatively shortened. Besides, various additional functions (such as paper cutting function, simultaneous transmission function, time-designated transmission function, etc.) can be enjoyed directly by those intrinsically owned by the transmission source facsimile. Accordingly, the present invention achieves the superior advantageous results that a rapid data transmission can be achieved without the conventional facsimile being replaced by a rapid type facsimile which is expensive, and various additional functions intrinsically owned by the conventional facsimile can be directly enjoyed or obtained.

In the case where the successive transmission control section is included, when a successive storage is selected by means of the successive storage selection switch, data directed to a plurality of various other parties can be transmitted from the facsimile in successive manner until the successive storage termination switch is actuated. These data are respectively compressed to be temporarily stored into the memory section. When the successive storage termination switch has been actuated, the data directed to the various other parties stored in the memory are sequentially read out and sequentially transmitted from the transmission control section to each of the other parties via the external communication circuit network. Thus, even when a plurality of persons wish to use the facsimile at the same time, since data are caused to be received and temporarily stored into the memory in successive manner within the limit of the transmission speed of the facsimile without the need to wail until the respective data transmissions through the external communication circuit network have been sequentially completed, the data transmissions from the plurality of persons can be dealt with efficiently in a speedy manner.

As mentioned above, in the case where an adaptor device for a facsimile is used which, by means data compression, allows data to be transmitted to the other party in a shorter time than the communication time normally required by the facsimile, a time for data communication can be effectively made shorter than that achieved by the intrinsic performance of the facsimile, without excessive equipment investment.

In the mean time, it is widely known in the field of communication equipment such as a telephone to measure a time which has been required for an actual communication and to then display the measured time in appropriate manner.

In the case where the adaptor device such as the above-mentioned is used which can shorten the communication time, measurement of a time required for an actual communication and display of the measured time may be easily realized by the application of the above-mentioned conventional techniques. However, with the above-mentioned conventional techniques alone, the shortened actual communication time can not be compared with the normal communication time, and the user can not realize to what extent the communication cost could be saved, and hence, the user can not accurately realize the economical benefit that have been achieved through the compressed data transmission.

It is therefore a second object of the present invention to provided an adaptor device for a facsimile which makes it possible to notify the user of an actual communication time that has been actually required for data transmission involving data compression and a presumed communication time that would have been required if the data transmission had been done without data compression, so that the user can effectively realize the advantageous result achieved from a shortened communication time by means of such transmission involving data compression.

To accomplish the second object of the invention, an adaptor device for a facsimile which is adapted to be connected between the facsimile and an external communication circuit network comprises a simulated communication circuit network section for, when a call has been given from the facsimile that is a transmission source facsimile to an other party's facsimile, receiving the call and data to be transmitted from the transmission source facsimile, data compression section for compressing the data received via the simulated communication circuit network section in accordance with a predetermined data compression technique, a memory section for temporarily storing compressed data, a transmission control section for reading out the data stored in the memory section and transmitting the same to the other party's facsimile via said external communication circuit network, a time measuring section for measuring, as a first communication time, a time of data communication done via said simulated communication circuit network section and for measuring, as a second communication time, a time of data communication done via the transmission control section, and a notification section for notifying the first and second communication times measured by said time measuring section.

When a call has been made to a certain other party, the simulated communication circuit network section receives this call and data to be transmitted from the facsimile; that is, the transmission source facsimile starts transmitting the data to the adaptor device as if the data were received by the other party's facsimile.

But, at this time, the data from the transmission source facsimile are really not sent to the external communication circuit network but they are sent to the simulated communication circuit network. The time of communication through the simulated communication circuit network is measured as the first communication time by the time measuring section.

The data received through the simulated communication circuit network are compressed by the data compression section, and the thus compressed data are temporarily stored into the memory section. When the data compression and storage have been terminated, the compressed data stored in the memory section are read out and transmitted via the external communication circuit network to the other party's facsimile, under the control of the transmission control section. Since the data transmitted via the external communication circuit network to the other party's facsimile are compressed form, the communication time can be relatively shortened. The time of communication through the transmission control section is measured as the second communication time.

The first and second communication times measured in the above-mentioned manner are notified to the user, so that the user comes to know an actual communication time that has been actually required for data transmission involving data compression, namely, the first communication time, and a presumed communication time that would have been required if the data transmission had been done without the data being compressed, and hence the user can effectively realize, based on the comparison between the notified two communication times, the benefit of a shortened communication time achieved by means of such transmission involving data compression.

A variety of ways can be considered for notifying the user of the communication times. For example, the communication times may be notified to the transmission source facsimile each time one transmission has been completed. Alternatively, data indicative of the measured first and second times may be stored in succession so that the data are read out to be notified whenever such notification is requested by the user's operating a switch or the like. Also, for visibly outputting the notified communication time data, the time data may be output for printing on the part of the transmission source facsimile, or may be output for a display on the part of the transmission source facsimile.

The preferred embodiments of the invention will hereafter be described in detail with reference to the accompanying drawings.

BRIEF DESCRIPTION OF THE DRAWINGS

In the drawings:

FIG. 5 is a flowchart showing an example function of the adaptor device when the device is in the reception mode;

FIG. 7 is a flowchart showing an example function of the adaptor device according to the second embodiment when the device is in the transmission mode.

DETAILED DESCRIPTION OF THE EMBODIMENTS

Figure 1:
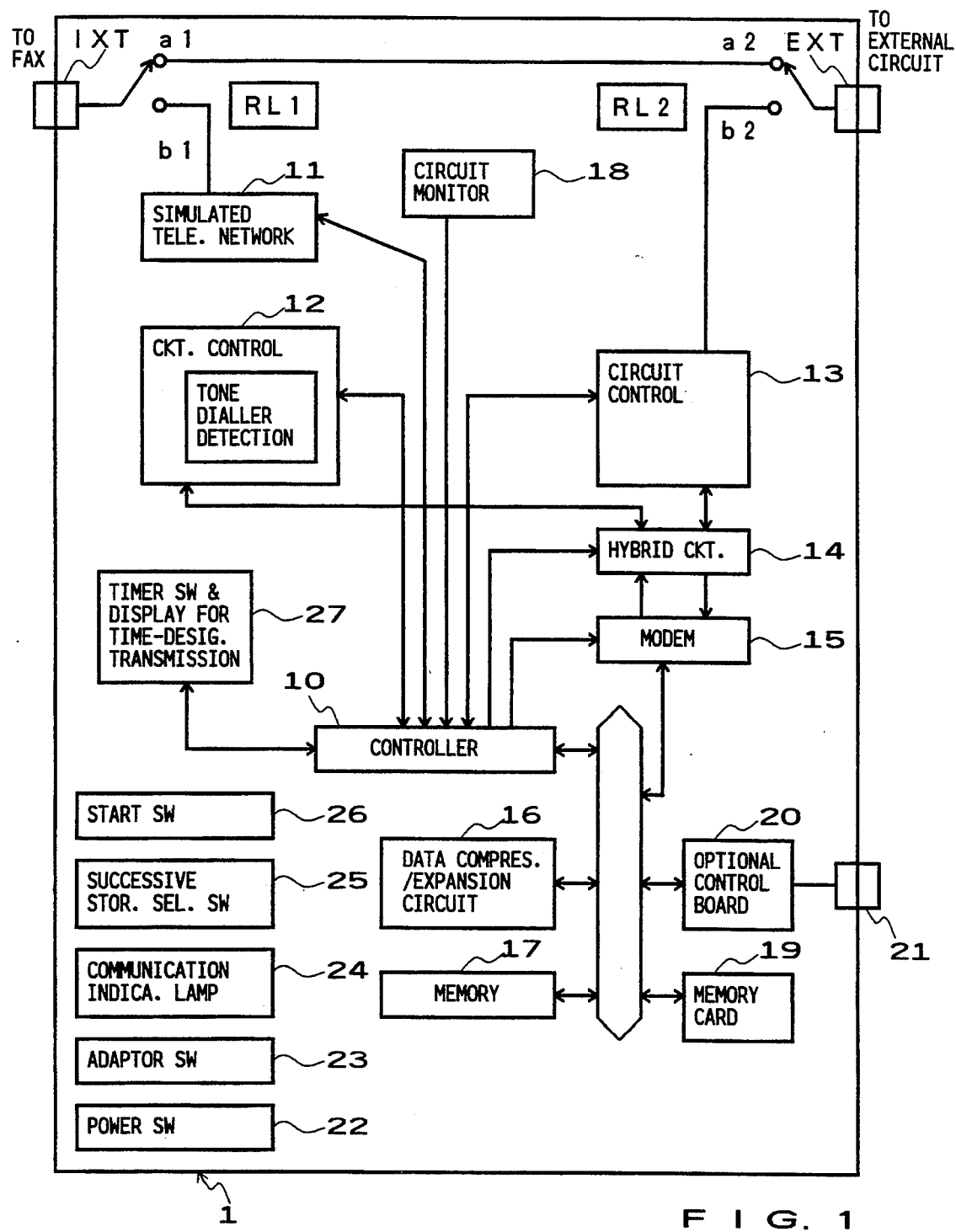
FIG. 1 is a block diagram showing an adaptor device according to a first embodiment of the present invention.
Figure 2:
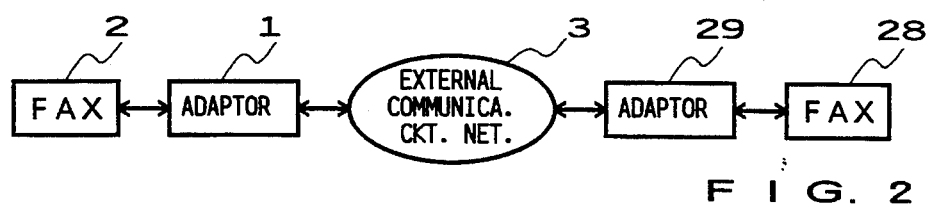
FIG. 2 is a block diagram showing a construction of an entire communication network utilizing the adaptor device.

An adaptor device 1 as shown in FIG. 1 is provided with a terminal IXT for connection with a facsimile which is hereinafter referred to as a facsimile side terminal and another terminal EXT for connection with an external circuit which is hereinafter referred to as an external circuit side terminal. That is, as shown in FIG. 2, the adaptor device 1 is designed to be connected between a facsimile 2 and an external circuit network 3, with the facsimile side terminal IXT being connected with the facsimile 2 and the external circuit side terminal EXT being connected with the external communication circuit network 3.

In FIG. 1, a controller 10 comprises a microcomputer which includes a CPU (Central Processing Unit), a program ROM, a working and data RAM and the like, and the controller 10 is principally engaged in management of data exchange within the adaptor device 1 and of processing operations in various circuits of the device 1.

Relays RL1, RL2 are provided for switching the connecting state of the adaptor device 1 in relation to the facsimile side terminal IXT and external circuit side terminal EXT. In more specific terms, when no specific operation of the adaptor device 1 is desired, each of the relays RL1, RL2 is connected to one contact a1, a2 so that the facsimile side terminal IXT and external circuit side terminal EXT are directly connected with each other. Connection of the relay RL1 to the other contact b1 causes the facsimile side terminal IXT to be connected via a simulated telephone network 11 to a circuit control circuit 12 in the adaptor device 1. On the other hand, connection of the relay RL2 to the other contact b2 causes the external circuit side terminal EXT to be connected a circuit control circuit 13 in the adaptor device 1.

When a call has been made from the facsimile 2 to a facsimile of a certain other party while the relay RL1 is in connection to the contact b1, the simulated telephone network 11 and circuit control circuit 12 receive this call and data to be transmitted from the source facsimile 2. A tone dialler detection circuit is included in the circuit control circuit 12 to detect a telephone number for calling the other party. More specifically, the simulated telephone network 11 and circuit control circuit 12 detect the call number generated from the facsimile 2 and send a reception signal to the facsimile 2, in accordance with which the facsimile 2 initiates its data reading and transmitting action. Then, the simulated telephone network 11 and circuit control circuit 12 receive the data supplied from the facsimile 2 and give a signal acknowledging receipt of the data if necessary. It is a matter of course that the telephone number for calling the other party is stored into a suitable circuit.

The data as received from the transmission source facsimile 2 via the simulated telephone network 11 and circuit control circuit 12 are sent via a hybrid circuit 14 to a data compression/expansion circuit 16 under the control of the controller 10. The hybrid circuit 14 serves to control the switching of the direction of data given to and from the circuit control circuits 12, 13.

The data compression/expansion circuit 16 is controlled by the controller 10 to operate in the compression mode, in which it compresses the data from the facsimile 2 in accordance with a predetermined compression technique. For example, in the case where the transmission source facsimile 2 is of the G III standard which employs the MR code, data now in such MR compression code may be further compressed in accordance with the MMR code according to the C IV standard.

The data compressed by the data compression/expansion circuit 16 are temporarily stored into a memory 17 under the control of the controller 10. Upon completion of compression and storage of all the data supplied from the source facsimile 2, the adaptor device 1 is changed over to a state in which the data are transmitted by the circuit control circuit 13 by way of the relay contact b2 and external circuit side terminal EXT.

In such case, the telephone number to call the other party is first automatically dialled in accordance with the control of the controller 10. Then, a response from the other party is received by the circuit control circuit 13, which, after having confirmed that predetermined conditions required for facsimile transmission have been fulfilled, begins transmitting the data. Namely, to transmit data to the other party, the data stored in the memory 17 are read out and sent via a modem 15 and the hybrid circuit 14 to the circuit control circuit 13, from which they are sent out to the external communication circuit network 3. Because the data are transmitted in an additionally compressed form as mentioned, the data transmission can be effected in a relatively short time, and hence the communication cost can be lowered.

The data compression/expansion circuit 16 also has a decoding function for expanding compressed data. For example, in the case where the other party has no equivalent decoding function for expanding compressed data, this compression/expansion circuit 16 performs the decoding function so as to expand the compressed data read out from the memory 17 into data of the normal size. The thus expanded or decoded data are then sent via the modem 15 and the hybrid circuit 14 to the circuit control circuit 13, from which it is sent out to the facsimile of the other party through the external communication circuit network 3. On the other hand, in the event where the data received from the facsimile of the other party are in compressed form, the data as received through the external communication circuit network 3 are applied by way of the hybrid circuit 14 and modem 15 to the memory 17 to be temporarily stored thereinto. Then, the compression/expansion circuit 16 performs the decoding function so as to expand the compressed data read out from the memory 17 into data of the normal size. The thus expanded or decoded data are applied by way of the modem 15 and hybrid circuit 14 to the circuit control circuit 12, from which they are sent out to the facsimile 2 at this end.

A circuit monitor circuit 18 is provided for monitoring a signal given from the external communication circuit network 3, and it controls the switching action of the relays PL1, R12, for example, when there has been a call from the other party. It is now to be appreciated that the memory 17 may comprise not only a fixedly mounted memory but also a removal memory such as a IC memory card. Also, as shown, an optional control board 20 and a connector 21 may be additionally provided for connecting a suitable external instrument such as a personal computer in such a manner that image data etc. provided from the external instrument can be received or transmitted as facsimile data.

Reference numeral 22 denotes a power switch of the adaptor device 1, and 23 denotes an adaptor switch that is turned on or turned off to start or stop the operation of the adaptor device 1, respectively. When the adaptor switch 23 is turned off, the above mentioned relays RL1, RL2 are brought into connection to the respective contacts a1, a2, and when the adaptor switch 23 is turned on, the relays RL1, RL2 are brought into connection to the respective contacts b1, b2. A communication indication lamp 24 is caused to be lit as long as data communication operation is performed in the adaptor device 1. A successive storage selection switch 25 is a switch for enabling successive reception of data that are directed to a plurality of different other parties. When the successive storage mode is selected by this successive storage selection switch 25, data to be transmitted from the transmission source facsimile 2 to the plurality of different other parties are received by the adaptor device 1 in successive manner and then compressed as previously mentioned to be temporarily stored into the memory 17 in sequence. Subsequently, when a start switch (successive storage termination switch) 26 is turned on, the data are read out from the memory 17 to be sequentially transmitted to the individual other parties. When the success storage mode is not selected by the successive storage selection switch 25, namely, when the simplex storage mode is selected, the above said successive data reception is not effected, but, in stead, compression, storage and transmission of data are effected separately for each other party. Reference numeral 27 denotes a timer switch/display 27 that is operated to carry out a time designated transmission of the data stored in the memory 17.

FIG. 2 illustrates how the adaptor device 1 of the invention is used. In order to realize a rapid transmission function by means of this adaptor device 1, it is necessary that a facsimile 28 of the other party should have data compression function according to the equivalent data compression technique or otherwise it should be provided with an adaptor device 29 which is equivalent to the adaptor device 1.

Now, an example operation of the adaptor device 1 will be described in detail with reference to the flow charts shown in FIGS. 3 through 5, the operation being effected in various circuits of the adaptor device 1 under the controls of the controller 10.

Figure 3:
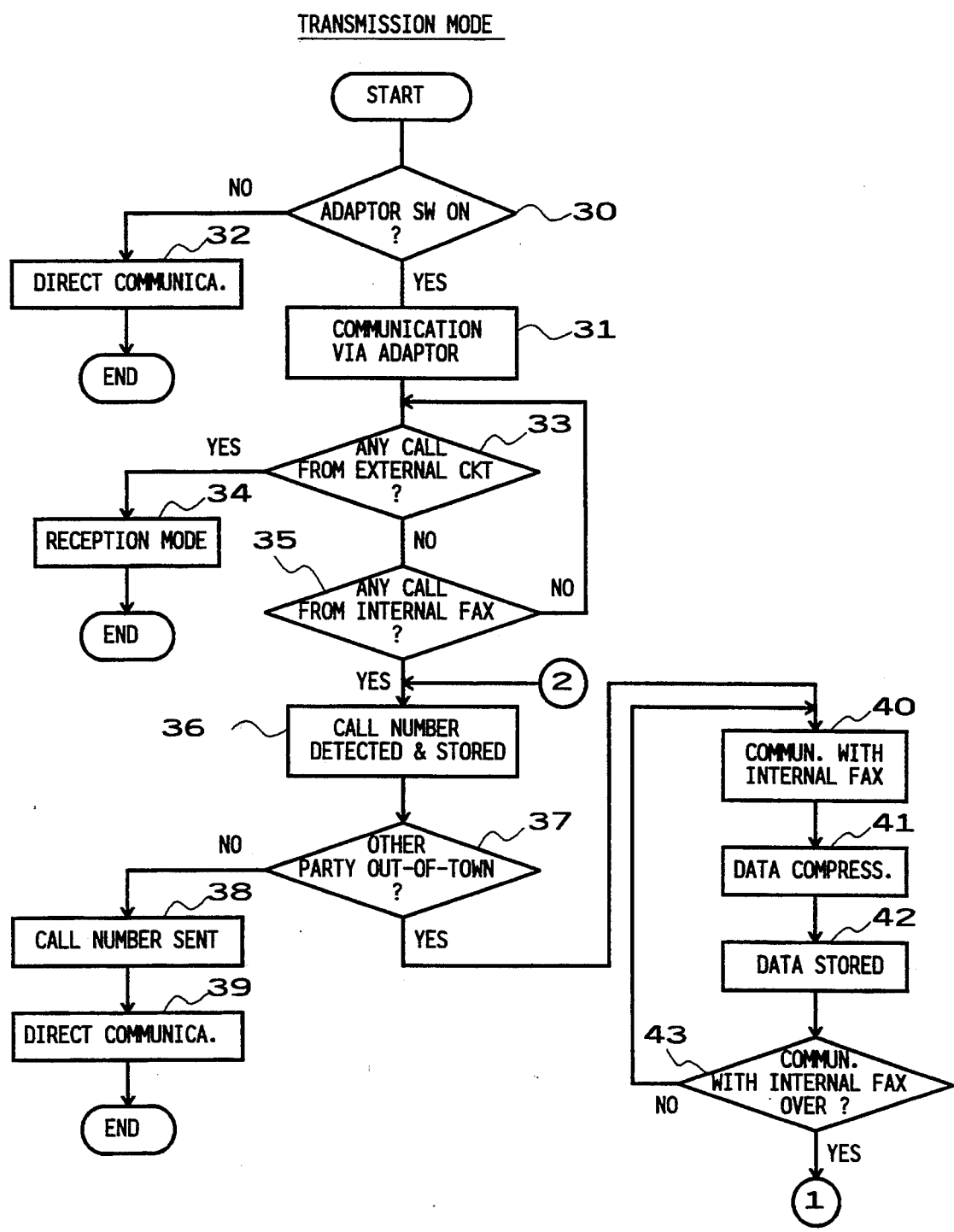
FIGS. 3 and 4 are a flowchart showing an example function of the adaptor device when the device is in the transmission mode.
Figure 4:
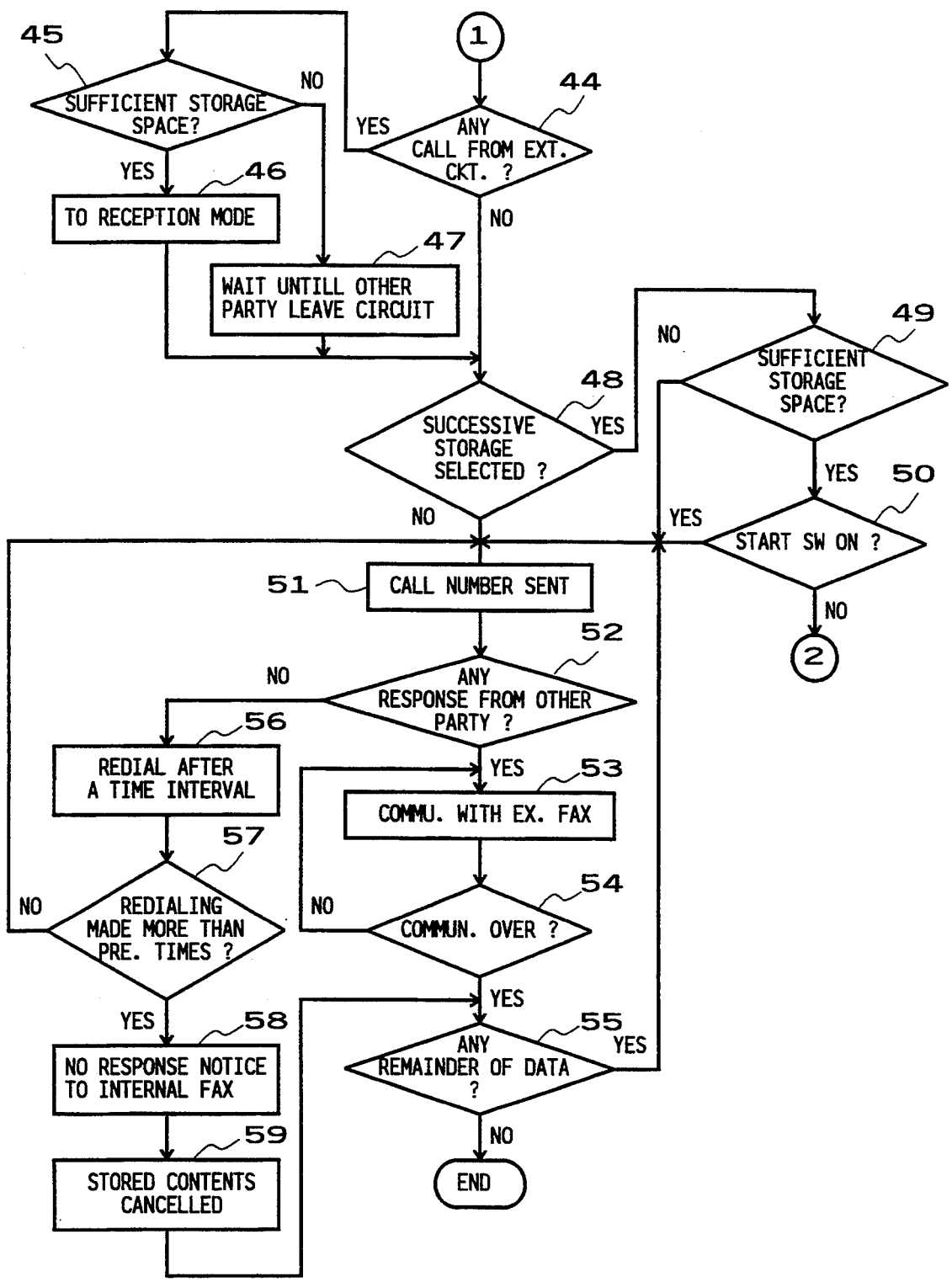

FIGS. 3 and 4 show a flow of operation to be done in the transmission mode. First, it is examined in step 30 whether the adaptor switch 23 is ON. If the adaptor switch 23 is ON, then the relays RL1, RL2 are connected to the contacts b1, b2 so that the internal facsimile 2 is connected to the simulated telephone network 11 and circuit control circuit 12, and the external communication circuit network 3 is connected to the circuit control circuit 13 (step 31). Conversely, If the examination result is NO, i.e., the adaptor switch 23 is OFF, then the relays RL1, RL2 are connected to the contacts a1, a2 so that the internal facsimile 2 is connected directly to the external communication circuit network 3, and the processing is ended (step 321).

When the communication through the adaptor device 1 is desired to continue, it is examined in step 33 whether there has been a call from an external circuit. If there has been a call from an external circuit, the adaptor device 1 is transferred to the reception mode (step 34). FIG. 5 showing a flow chart of operation in the reception mode. If, on the other hand, there has been no call from an external circuit, it is further examined whether there has been a call from the internal facsimile 2 (step 35). If there has been a call from the internal facsimile 2 to a certain other party, a call number of the other party is detected and stored (step 36). Next, it is examined whether the other party's call number is of the out-of-town station code (step 37). If the other party's call number is of the out-of-town station code, the processing through the adaptor device 1 is continued. But, if the other party's call number is of the intra-city station code, the other party's call number dialled is sent to the external communication circuit network 3 (step 38), the relays RL1, RL2 are connected to the contacts a1, a2 so that the internal facsimile 2 comes into direct connection to the external communication circuit network 3 (step 39), and the processing is terminated. The reason why the internal facsimile 2 is directly connected to the external communication circuit network 3 in this case is that a intra-city call is inexpensive, and hence it is not be necessary to make use of the adaptor device 1 for data transmission. However, in some applications, steps 37–39 may be omitted.

After the call number of the other party dial led has been stored in step 36, communication between the internal facsimile 2 and the adaptor device 1 is started via the simulated telephone network 11 and circuit control circuit 12, so that the internal facsimile 2 initiates its data reading action, and data thus read from the facsimile 2 are received by the device 1 (step 40). Then, the data received from the internal facsimile 2 are compressed by the data compression/expansion circuit 16, and the thus compressed data are stored into the memory 17 (steps 41 and 42). Next, it is examined whether communication with the internal facsimile 2 has been terminated (step 43), and steps 40–42 are repeated until data transmitting action of the internal facsimile 2 has been terminated.

When communication with the internal facsimile 2 has been terminated, it is examined, before a call is made from the adaptor device 1 to the communication circuit network 3, whether there has been a call from the network 3 (step 44). If there has been a call from the network 3, it is further examined whether there is sufficient storage space available in the memory 17 (step 45). If there is sufficient storage space available in the memory 17, the adaptor device 1 is changed over to the reception mode to carry out the processing shown in FIG. 5 for receiving data from the external communication circuit network 3 (step 46). On the other hand, if there is no sufficient storage space available in the memory 17, the adaptor device 1 is placed in a temporary-wait state until the other party has stopped calling to leave the circuit (step 47).

If the examination result in step 44 indicates that there has been no call from the external communication circuit network 3, or, after steps 46 and 47 have been completed, step 48 is taken in which it is examined whether the successive storage selection switch 25 is ON. If the successive storage selection switch 25 is ON, it is examined whether there is sufficient storage memory space available in the memory 17 (step 49). If there is sufficient storage space available in the memory 17, it is examined whether the start switch (successive storage termination switch) 26 has been turned ON (step 50). In the case where successive storage can be continued, the examination result in step 50 should be NO, and the flow jumps to step 36. Then, steps 36–43 are repeated so as to allow data directed to a plurality of various other parties to be received in successive manner, and stored into the memory 17.

If the successive storage selection switch 25 is not ON (namely, the examination result in step 48 is NO), or if there is not sufficient storage space available in the memory 17 (namely, the examination result in step 49 is NO), or if the start switch (successive storage termination switch) 26 has been turned ON (namely, the examination result in step 50 is YES), then the call number of the other party transmitted by the circuit control circuit 13 (step 51) to the external communication circuit network 3. Next, it is examined whether there has been a response from the other party (step 52). If there has been a response from the other party, communication between the facsimile of the other party and the adaptor device 1 is started, so that the data stored in the memory 17 are read out to be transmitted to the facsimile of the other party (step 53). At that time, the data read out from the memory 17 are directly transmitted to the facsimile 2 if the facsimile of the other party is provided with a function for decoding compressed data which is equivalent to that provided in the adaptor device 1. However, the facsimile of the other party is not provided with such a compressed data decoding function, then the data read out from the memory 17 is transmitted after having been decoded by the data compression/expansion circuit 16. Subsequently, it is examined in step 54 whether the communication to the facsimile of the other party has been terminated, and the process of step 53 is continued until the communication to the other party's facsimile has been terminated.

When the communication to the other party's facsimile has been terminated, it is examined in step 55 whether there is any remainder of data to be transmitted previously stored in the successive storage mode. If the examination result is affirmative, the flow returns to step 51 in which the call number of the party associated with the remaining data is transmitted and subsequently steps 52–54 are repeated to transmit the data. If, on the other hand, there is no remainder of data previously stored in the successive storage mode, this processing is caused to come to an end.

If a response from the other party could not be confirmed in step 52, reservation is made for recalling the other party later in a predetermined time (step 56). Next, it is examined whether recalling of the other party has been made more than predetermined times (step 57). If NO, the flow returns to step 51 for further recalling. If recalling of the other party has been made more than predetermined times, a notice indicative of "no response" is given to the internal facsimile (step 58). Thereafter, after canceling or erasing the corresponding stored contents in the memory 17, the flow advances to step 55.

Next, the reception mode is described with reference to FIG. 5. First of all, for caution's sake, it is checked again whether the adaptor switch 23 is ON (step 60). If the adaptor switch 23 is ON, the relays RL1, RL2 are connected to the contacts b1, b2 so that the internal facsimile 2 is connected to the simulated telephone network 11 and circuit control circuit 12, and the external communication circuit network 3 is connected to the circuit control circuit 13 (step 61). Conversely, If the adaptor switch 23 is OFF, the relays RL1, RL2 are connected to the contacts a1, a2 so that the internal facsimile 2 is directly connected to the external communication circuit network 3 (step 62), and then the processing is caused to come to an end.

In the case where the adaptor switch 23 ON, a call signal from the external communication circuit network 3 is received in step 63, and it is examined in step 64 whether the other party has made the transmission using an adaptor device that is equivalent to the adaptor device 1. If NO, the internal facsimile 2 is directly connected to the external communication circuit network 3 (step 65), and then the process is caused to come to an end, since in such a case it is not necessary to carry out a communication through the adaptor device 1. If, on the other hand, the examination result in step 64 is YES, communication is started between the other party's adaptor device and the adaptor device 1 so that compressed data sent via the external communication circuit network 3 from the other party's adaptor device are received by the adaptor device 1 via the circuit control circuit 13 (step 66). The thus received data are applied via the hybrid circuit 14 and modem 15 to the memory 17 to be stored therein (step 67). Then, it is examined whether the communication with the other party's adaptor device has been terminated (step 68), and the above-mentioned steps 66–68 are repeated until data transmission action of the other party's adaptor device has been terminated.

When data transmission action of the other party's adaptor device has been terminated, the communication through the external communication circuit network 3 is disconnected. Thereafter, prior to decoding the compressed data stored in the memory 17, it is examined whether there has been another call from the external communication circuit network 3 (step 69). If there has been another call from the external communication circuit network 3, it is further examined whether there is sufficient storage space available in the memory 17 (step 70). If there is sufficient storage space available in the memory 17, the flow returns to step 60 to carry out data reception action. If, on the other hand, there is not sufficient storage space available in the memory 17, the adaptor device 1 is placed in a temporary-wait state until the other party has stopped calling to leave the circuit (step 71).

After the data transmitted from the other party's facsimile adaptor device 1 have all been received and stored into the memory and the communication has been terminated, the thus received compressed data are read out from the memory 17 and are expanded or decoded in the data compression/expansion circuit 16 (step 72). Then, communication between the adaptor device 1 and the internal facsimile 2 is started via the simulated telephone network 11 and circuit control circuit 12, so that data reception action of the internal facsimile 2 is initiated and the decoded data are sent to the internal facsimile 2 to be received thereby (Step 73). Thereafter, it is examined whether the communication between the adaptor device 1 and the internal facsimile 2 has been terminated (step 74), and the above-mentioned steps 72 through 74 are repeated until data transmission to the internal facsimile 2 has been terminated. During such period, it is determined, based on the presence of a out-of-paper signal, whether the internal facsimile 2 has run out of papers (step 75). If the internal facsimile 2 has not run out of papers, steps 72 through 74 are repeated. But if the internal facsimile 2 has run out of papers, the adaptor device 1 is placed in a temporary-wait state until the internal facsimile 2 has been resupplied with papers; that is, steps 75 through 75 are repeated until the examination result in step 75 becomes NO. Then, it is examined whether there has been another call from the external communication circuit network 3 or from the internal facsimile 2. If there has been another call, the adaptor device 1 is changed over to the reception mode or to the transmission mode (step 77). In this reception mode or transmission mode, a routine equivalent to that shown in FIG. 3 or 5 is carried out until a given step thereof has been completed. After that, the flow returns to step 75 to examine whether there has been a resupply of papers. If there has been another call from the external communication circuit network 3 or from the internal facsimile 2, the adaptor device 1 is placed in a temporary-wait state, and then the flow returns to step 75 to examine whether there has been a resupply of papers (step 78).

Now, the second embodiment will be described with reference to FIGS. 6 and 7.

Figure 6:
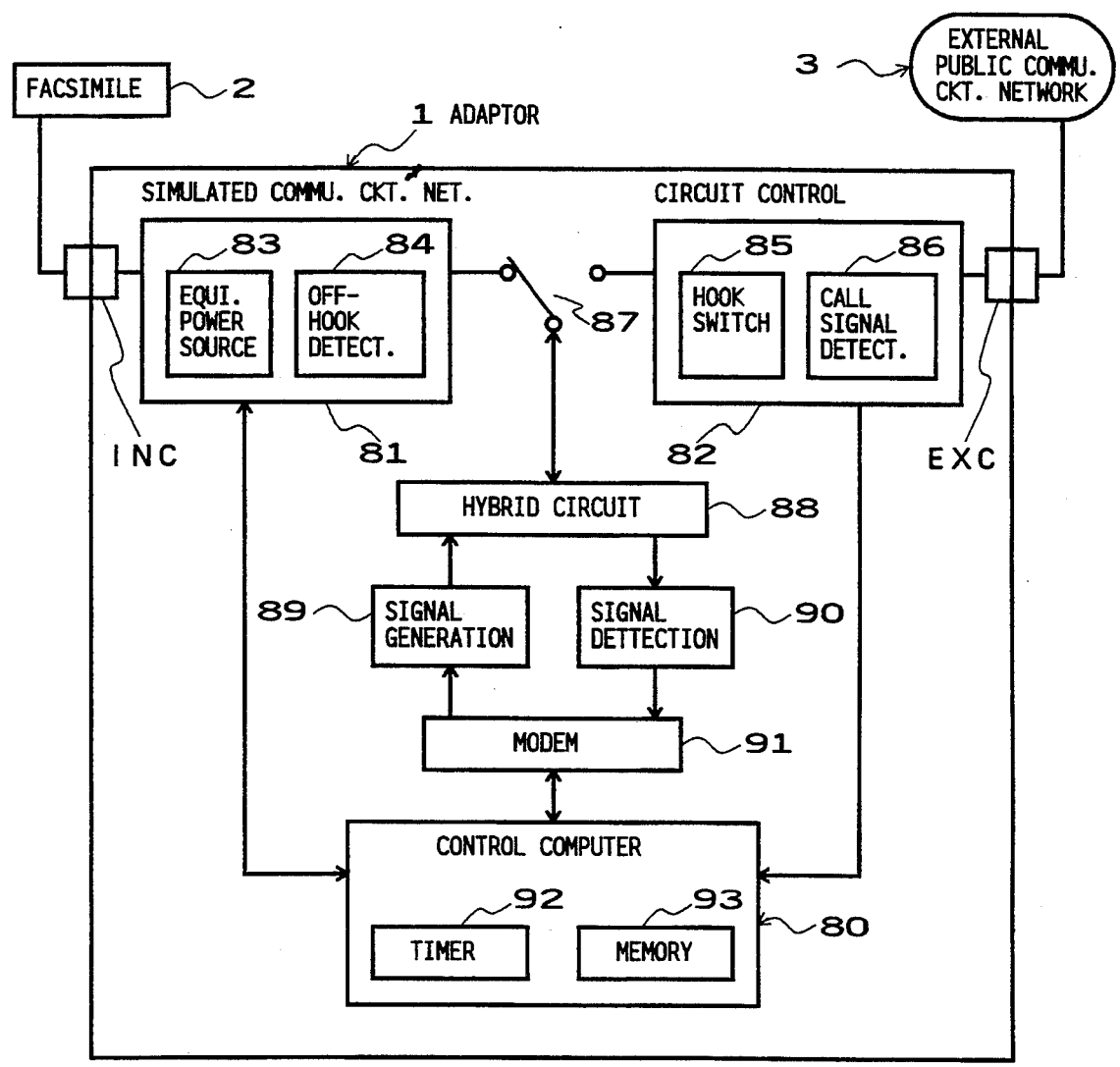
FIG. 6 is a block diagram showing an adaptor device according to a second embodiment of the present invention.

An adaptor device 1 as shown in FIG. 6 includes a connector INC for connection with a facsimile 2 which is hereinafter referred to as a facsimile side connector and another connector EXC for connection with an external public communication circuit network 3 which is hereinafter referred to as an external circuit side connector. As previously shown in FIG. 2 in connection with the first embodiment, this adaptor device 1 is connected between the facsimile 2 and the external public communication circuit network 3, via the connector INC connected with the facsimile 2 and the connector ENC connected with the external public communication circuit network 3.

In FIG. 6, a control computer 80 is principally engaged in management of data exchange within the adaptor device and of processing operations in various circuits of the device 1. In the adaptor device 1, the facsimile side connector INC is connected to a simulated communication circuit network 81, and the external circuit side connector EXC is connected to a circuit control device 82.

The simulated communication circuit network 81 includes an equivalent power source device 83 and a hook-off detection device 84, and it carries out a communication processing equivalent to that carried out when the public communication circuit network 3 is in connection to the facsimile 2. The circuit control device 82 includes a hook switch 85, a call signal detection device 86, etc., and it controls communication between the control computer 80 and the public communication circuit network 3.

Data signal inputting and outputting lines of the simulated communication 81 and circuit control device 82 are connected to a hybrid circuit 88. The hybrid circuit 88 serves to control the switching of the direction of data given to and from the adaptor device 2. The hybrid circuit 88 is connected to a signal generation device 89 and a signal detection device 90 which are connected via a modem 91 to the control computer 80. Also, within the control computer 80 are contained a timer circuit 92 for measuring a time and a memory 93 (such as a RAM) for temporarily storing various data such as transmitted data, received data and data indicative of a measured time.

The control computer 80, in addition to controlling processing operations of various circuit devices, carries out a data compression process for compressing data received through the simulated communication circuit network 81 in accordance with a predetermined data compression technique, a process for temporarily storing the compressed data into the memory 93, and a process for reading out the data stored in the memory 93 and transmitting the data to the external public communication circuit network 3 through the circuit control device 82. It is a matter of course that in the case where the other party's facsimile is provided with a compression/expansion device employing data compression/expansion technique similar to that employed in the adaptor device the above-mentioned data compression carried out by the control computer 80, but in the case where the other party's is not provided with such a device, the received data are transmitted directly to the external public communication circuit network 3 without being subjected to the above-mentioned data compression process.

Further, the control computer 80 carries out a process for measuring, as a first communication time, a communication time which has been required or consumed for the data to be transmitted from the facsimile 2 to the simulated communication circuit network 81, a process for measuring, as a second communication time, a communication time which has been required for the data to be transmitted to the other party's facsimile through the circuit control device 82 and external public communication circuit network 3, a process for storing time data indicative of the measured first and second communication times into the memory 93, and a process for notifying the user of the time data stored in the memory 93.

Moreover, the control computer 80 carries out a process for decoding compressed data received from the other party's facsimile through the external public communication circuit network 3 and circuit control device 82, and also a process for transmitting the thus decoded received data to the facsimile 2 through the simulated communication circuit network 81. Of course the above-mentioned decoding process is not carried out in the case where the data from the other party's facsimile are not in compressed form.

Next, a specific example of operation of the adaptor device 1 performed when data is transmitted from the facsimile 2 to a facsimile of a desired other party is described on the basis of a flow chart shown in FIG. 7. This operation is carried out by various circuits and devices within the adaptor device 1 under the controls of the control computer 80.

When the facsimile 2 is place in on-hook state electrical power necessary for communication is supplied from the equivalent power source device 83 to the facsimile 2, and at the same time, the off-hook state of the facsimile 2 is notified to the control computer 80 by the off-hook detection device 84. In response to this, the control computer 80 causes the switching circuit 87 to be connected to the simulated communication circuit network 81 and also causes the signal generation device 89 to output a dial tone. This dial tone is transmitted to the facsimile 2 via the hybrid circuit 88, switching circuit 87 and facsimile side communication connector INC. Upon detection of the reception of the dial tone, the facsimile 2 outputs dial signals of the other party, the dial signals being sent to the signal detection device 90 via the communication connector INC, switching circuit 87 and hybrid circuit 88. Upon receipt of the dial signals, the signal detection device 90 notifies the dial number to the control computer 80, the dial number then being stored into the memory 93 in the computer 80.

As soon as the control computer 80 has received the first dial signal, it causes the signal generation device 89 to stop outputting the dial tone. Then, after having confirmed that output of the dial signals has been terminated, the control computer 80 causes the signal generation device 89 to output a ringback tone which is given to the facsimile 2. Subsequently, the control computer 80 causes the signal generation device 89 to stop outputting the ringback tone and reverses the polarity of the equivalent power source device 83, based on which the facsimile 2 starts transmitting data. Also, on the basis of the output of the timer circuit 92, the control computer 80 stores into the memory 93 the time when the polarity of the power source device 83 has been reversed, namely, the time when data transmission from the facsimile 2 has started.

Coding of data in the facsimile 2 is performed in accordance with the normal data coding technique employed in the facsimile 2 (for example, the MR coding technique regulated by the advice T-4 of the CCITT).

Transmission of coded data from the facsimile 2 to the simulated communication circuit network 81 is performed in accordance with the normal communication technique employed the facsimile 2 (for example, the technique according to the CCITT advice V. 29 regulated by the CCITT advice T-30). This data transmission from the facsimile 2 to the simulated communication circuit network 81 will hereafter be referred to as a first communication. The start time of the first communication is stored in the memory 93 as mentioned above.

The data transmitted to the adaptor device 1 by the first communication are compressed in accordance with a Predetermined data compression technique for higher compression (such as the MMR code) through the data compression process by the control computer 80. The data thus coded in a higher compressed form is temporarily stored into the memory 93.

When the transmission from the facsimile 2, namely the first communication has been terminated, the circuit between the facsimile 2 and the simulated communication circuit network 81 is disconnected. The circuit disconnection is performed in a known technique such as that regulated by the CCITT advice T-30. In response to the circuit disconnection, the control computer 80 stores the end time of the first communication into the memory 93.

Thus, the communication time which has been required for the transmission from the facsimile 2 to the simulated communication circuit network 81, namely, the first communication time can be measured on the basis of the start time and end time of the first communication stored in the memory 93.

Next, the control computer 80 causes the switching circuit 87 to be connected to the circuit control device 82, reads out the dial number of the other party's stored in the memory 93 and sends the same to the external communication circuit network 3 via the circuit control device 82 so as to call the other party's facsimile. Then, after having confirmed the receipt of a response from the other party's facsimile, the control computer 80 determines whether or not the other party is provided with an adaptor device 29 that employs a data compression technique for higher compression which is equivalent to that employed in the adaptor device 1. When it has been determined that the other party is provided with such an adaptor device 29, the control computer 80 reads out the more highly compressed data stored in the memory 93, so that the data are sent via the circuit control device 82 to the public communication circuit network 3 and transmitted to the other party in accordance with a higher-speed communication technique (such as the technique regulated by the CCITT advice V. 33). This transmission 1 will hereafter be referred to as a second communication.

When connection has been made with the other party's facsimile, namely, the second communication has been started, the start time of the second communication is stored into the memory 93. When the transmission has been terminated, the connection is broken in accordance with a predetermined technique (such as the technique regulated by the CCITT advice T-30), the end time of the second communication is stored into the memory 93. Thus, based on the start and end times of the second communication stored in the memory 93, it is allowed to measure a communication time which has been required for the actual data transmission to the other party via the external public communication circuit network 3, namely, the second communication time.

The measured first and second communication times are stored into the memory 93 in an appropriate manner. The, the control computer 80 carries out the process for notifying the user of the first and second communication times.

A variety of ways can be considered for notifying the user of the communication times. For example, the communication times may be notified to the transmission source facsimile each time one transmission has been completed. Alternatively, data indicative of the measured first and second times may be stored in succession so that the data are read out to be notified whenever such notification is requested by operating a switch or the like, or periodically, or on other suitable occasions. Also, for visibly outputting the notified communication time data for display, the time data may be output for printing on the part of the transmission source facsimile, or may be output on a display on the part of the transmission source facsimile. Or, the data may be output for display on a display or a printer provided on the part of the adaptor device 1.

It is a matter of course that the embodiment shown in Figs. 1 through 5 can be arranged to have the functions for measuring communication times and notifying the measured communication times which are similar to those in the second embodiment shown in FIGS. 6 and 7.

As so far described, according to the present invention, since data to be transmitted from an internal facsimile to an other party's facsimile are compressed and then transmitted via an external communication circuit network to the other party's facsimile, the data transferred through the external communication circuit network are more highly compressed data, and hence a time required for the transmission can be relatively shortened. Further, various additional functions (such as paper cutting function simultaneous transmissive communicating function, time-designated transmission function, etc.) can be enjoyed or obtained from those intrinsically owned by the transmission source facsimile. Accordingly, the present invention achieves the superior advantageous results that a rapid data transmission can be achieved without the facsimile being replaced by a rapid type facsimile which is expensive, and various additional functions intrinsically owned by the conventional facsimile can be directly enjoyed.

Further, in the case where a successive transmission control means is included, it is made possible for the facsimile itself to receive data directed to a plurality of various other parties so that the data are subsequently compressed and sequentially transmitted to the individual other patties. Thus, even when a plurality of persons wish to use one facsimile at the same time, data are received and temporarily stored in the memory in successive manner within the limit of the transmission speed of the facsimile without the need to wail until the respective data transmissions through the external communication circuit network have been completed, and thus the transmissions from the plurality of persons can be dealt with in a speedy manner.

Moreover, according to the present invention, an actual communication time that has been required for data transmission involving data compression, namely, the first communication time, and a presumed communication time that would have been required if the transmission had been done without the data being compressed are measured and notified to the user, so that the user effectively realize, based on the comparison between the two communication times, the benefit of a shortened communication time achieved by means of such transmission involving data compression and also the economical benefit achieved by the shortened communication time.

What is claimed is:

1. An adaptor device for a first facsimile which is adapted to be connected between the first facsimile and an external communication circuit network, said first facsimile being adapted for inputting and outputting first facsimile data coded in accordance with a first predetermined facsimile coding system, which device comprises:

simulated communication network means for, when a call informing a second facsimile of another party that facsimile data is going to be transmitted has been generated from the first facsimile, receiving the call and the first facsimile data to be transmitted from the first facsimile;

data compression means for compressing the first facsimile data received via the simulated communication network means in accordance with a predetermimed data compression technique, so as to provide second facsimile data coded in accordance with a second predetermined facsimile coding system, said second facsimile data being compressed further than said first facsimile data;

memory means for storing said second facsimile data provided from said data compression means; and transmission control means for reading out of second facsimile data stored in the memory means and transmitting the same to the second facsimile of the other party via the external communication circuit network, wherein said transmission control means determines whether or not the other party has a function for decoding data compressed in accordance with said predetermined data compression technique, and said control means transmits the data read out from the memory means via the external communication circuit network if the other party has the function for decoding the data, but said control means decodes the data read out from the memory means and then transmits decoded data to the other party via the external communication circuit network if the other party does not have the function for decoding the data.

2. An adaptor device as defined in claim 1 which further comprises:

reception control means for receiving data given from the other party via said simulated communication network, and for determining which of the first and second coding systems the received data from the other party are coded, said reception control means giving the received data to the first facsimile if the received data are coded in accordance with the first coding system but storing the received data into said memory means if the received data are coded in accordance with the second coding system, and decoding means for reading out the data stored in said memory means by said reception control means and decoding the same into data of the first coding system;

wherein the data decoded by said decoding means are given to said first facsimile via said simulated communication means.

3. An adaptor device for a first facsimile which is adapted to be connected between the first facsimile and an external communication circuit network, said first facsimile being adapted for inputting and outputting first facsimile data coded in accordance with a first predetermined facsimile coding system, which device comprises:

simulated communication network means for, when a call informing a second facsimile of another party that facsimile data is going to be transmitted has been generated from the first facsimile, receiving the call and the first facsimile data to be transmitted from the first facsimile;

data compression means for compressing the first facsimile data received via the simulated communication network means in accordance with a predetermined data compression technique, so as provide second facsimile data coded in accordance with a second predetermined facsimile coding system, said second facsimile data being compressed further than said first facsimile data;

memory means for storing said second facsimile data provided from said data compression means; and transmission control means for reading out the second facsimile data stored in the memory means and transmitting the same to the second facsimile of the other party via the external communication circuit network;

wherein the device further includes a successive storage selection switch, a successive storage termination switch and successive transmission control means, and wherein said successive transmission control means successively receives data directed to various other parties which are given from said first facsimile via said simulated communication network and causes said data to be successively stored into said memory means via said data compression means, when a successive storage selection is selected by said successive storage selection switch, and wherein said successive transmission control means sequentially reads out the second facsimile data directed to the various other parties which are stored in said memory means and causes the data to be transmitted to each of said other parties via said transmission control means, when said successive storage termination switch has been actuated.

4. An adaptor device as defined in claim 3 which further comprises:

reception control means for receiving data given from the other party via said simulated communication network, and for determining which of the first and second coding systems the received data from the other party are coded, said reception control means giving the received data to the first facsimile if the received data are coded in accordance with the first coding system but storing the received data into said memory means if the received data are coded in accordance with the second coding system, and decoding means for reading out the data stored in said memory means by said reception control means and decoding the same into data of the first coding system;

wherein the data decoded by said decoding means are given to said first facsimile via said simulated communication means.

5. An adaptor device for a first facsimile which is adapted to be connected between the first facsimile and an external communication circuit network, said first facsimile being adapted for inputting and outputting first facsimile data coded in accordance with a first predetermined facsimile coding system, which device comprises:

simulated communication circuit network means fort when a call informing a second facsimile of another party that facsimile data is going to be transmitted has been generated from the first facsimile receiving the call and the first facsimile data from the first facsimile;

data compression means for compressing the first facsimile data received via the simulated communication circuit network means in accordance with a predetermined compression technique so as to provide second facsimile data coded in accordance with a second predetermined facsimile coding system, said second facsimile data being compressed further than said first facsimile data;

memory means for storing said second facsimile data provided from said data compression means;

transmission control means for reading out the second facsimile data stored in the memory means and transmitting the same to the second facsimile of the other party via said external communication circuit network;

time measuring means for measuring, as a first communication time, a time of data communication done via said simulated communication circuit network means and for measuring, as a second communication time, a time of data communication done via the transmission control means; and notification means for notifying the first and second communication times measured by said time measuring means;

wherein said transmission control means determines whether or not the other party has a function for decoding data compressed in accordance with said predetermined data compression technique, and said control means transmits the data read out from the memory means via the external communication circuit network if the other party has the function for decoding the data, but said control means decodes the data read out from the memory means and then transmits decoded data to the other party via the external communication circuit network if the other party does not have the function for decoding the data.

6. An adaptor device as defined in claim 5 wherein said notification means sends data indicative of the first and second communication times to the first facsimile when there is a notification request, so that the data indicative of the first and second communication times can be output for printing on the part of the first facsimile.

7. An adaptor device as defined in claim 5 wherein said notification means sends the data indicative of the first and second communication times to the first facsimile when there is a notification request, so that the data indicative of the first and second communication times can be output on a display on the part of the first facsimile.

* * * * *